United States Patent [19]

Hamanaka et al.

[11] Patent Number: 5,002,992
[45] Date of Patent: Mar. 26, 1991

[54] PERMANENT ANTISTATIC RESIN COMPOSITION

[75] Inventors: Hiroyoshi Hamanaka, Yachiyo; Tetsuji Kakizaki, Yokkaichi, both of Japan

[73] Assignee: Mitsubishi Petrochemical Company Limited, Tokyo, Japan

[21] Appl. No.: 320,392

[22] Filed: Mar. 8, 1989

[30] Foreign Application Priority Data

Mar. 11, 1988 [JP] Japan .................................. 63-57647

[51] Int. Cl.$^5$ ................................................ C08L 5/55
[52] U.S. Cl. ............................ 524/183; 525/186; 525/179; 525/167; 525/166; 524/912; 528/8
[58] Field of Search ............... 525/186, 167, 166, 179; 524/183, 912; 528/8

[56] References Cited

FOREIGN PATENT DOCUMENTS 0024043 11/1967 Japan .................................. 524/183
0108450 6/1985 Japan .................................. 524/183

Primary Examiner—Paul R. Michl
Assistant Examiner—Umakant K. Rajguru
Attorney, Agent, or Firm—Wegner, Cantor, Mueller & Player

[57] ABSTRACT

An antistatic resin composition comprising the components (1) and (2) shown below:

component (1): a propylene copolymer comprising (A) and/or (B) shown below:

(A) a propylene random copolymer having a melt flow rate of 0.1 to 70 g/10 min. obtained by feeding 0.5 to 4.0% by weight of ethylene, 66.0 to 98.5% by weight of propylene and 1.0 to 30.0% by weight of an α-olefin having 4 to 12 carbon atoms (all ratios based on the total amount of the three components) into a polymerization system;

(B) a propylene random copolymer having a melt flow rate of 0.1 to 70 g/10 min. obtained by feeding 2.5 to 10.0% by weight of ethylene and 90.0 to 97.5% by weight of propylene (both ratios based on the total amount of the two components) into a polymerization system;

component (2): a polymeric charge-transfer type complex which is the reaction produce of one or more of semi-polar organic boron polymeric compounds represented by the formula I shown below with one or more of tertiary amines with total carbon atoms of 5 to 82 having at least one hydroxyl group, produced through reaction at a ratio of one boron atom to one basic nitrogen atom:

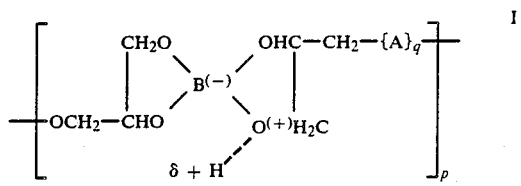

wherein q is 0 or 1, and when q=1, A represents —(X)a—(Y)b—(Z)c— group [X and Z each represent an oxygen-containing hydrocarbon residue with a total of 100 carbon atoms or less having one terminal ether residue, and Y represents

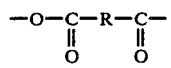

group (R is a hydrocarbon group having 1 to 82 carbon atoms) or

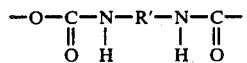

group (R' is a hydrocarbon group having 2 to 13 carbon atoms). a, b and c are each 0 or 1]; and p is 10 to 1000.

8 Claims, No Drawings

PERMANENT ANTISTATIC RESIN COMPOSITION

BACKGROUND OF THE INVENTION

1. Field of the Art

This invention relates to a resin composition to cope with electrostatic troubles incurred in the wrapping and packaging of semiconductors, electronic circuit substrates, electronic parts, electronics instruments, medical instruments and precision instruments, and also the anti-dust packaging of pharmaceuticals, cosmetics, foods and the packaging of dangerous materials, etc.

2. Background Art

Plastics have been used in a wide variety of fields because of their excellent properties such as transparency, durability and light weight, but since they are electrically insulating materials, various troubles due to static charges occur depending on the use or the method of use. Above all, in the field of electronics, destruction and damage to IC and LSI have become problems, and how to cope with static charges is an important and imminent topic.

For that purpose, it is necessary to improve the electrical characteristics of surrounding insulating materials that readily generate charges, and heretofore plastics kneaded with metal fibers or metal plated fibers, films and sheets blended with carbon black, graphite, tin oxide, zinc oxide, indium oxide, etc. have been made. However, these inorganic electroconductive agents cannot convert an insulating material to a material which will not be charged unless they are present to the extent that they are in mutual contact with each other in the matrix resin However, this involves drawbacks of increasing production cost and also of the physical properties possessed by the substrate material being remarkably changed Also, no transparent antistatic molded product can be made using these inorganic materials.

Alternatively an internally kneaded type antistatic agent applying a surfactant has also been widely used. This type of antistatic agent is superior to the above mentioned inorganic materials in that the amount of it to be added to a substrate material can be small, and its use does not change the physical properties of the substrate material so much and also can provide a transparent molded product with ease at low cost.

However, this antistatic agent involves some serious problems.

Thus, the effect of the antistatic agent is first exhibited when its molecules migrate to the surface of the substrate material, but the exposed agent on the surface is unstable and may be distured or removed by external conditions and factors such as temperature, humidity or contact, friction and the like. Most of the molecules of the agent present in the internal of the substrate material will migrate to the surface after the elapse of a certain period of time, and be drawn out. Accordingly, this type of antistatic agent is generally very poor in suitability and persistence of antistatic effect. Furthermore, since the antistatic mechanism itself is due to the carrier effect (ion conduction mechanism) brought about by the hydrophilic groups of the antistatic agent molecules existing on the surface of the substrate, if there occurs even a minimum disturbance in the oriented adsorption state of the antistatic agent molecules on the surface, it becomes impossible to achieve 100% decay of the charge.

Accordingly, it cannot be said in the strict sense that the aforementioned antistatic agents are a means to eliminate the influence of surrounding static charges during the transportation and use of IC and LSI-related functional products.

SUMMARY OF THE INVENTION

The present invention is intended to provide a solution to this problem, and it has been accomplished based on the finding that a permanent and stable nonchargeable polypropylene copolymer composition can be obtained to remove the chargeability of the polypropylene copolymer and can quickly and completely discharge the charges momentarily generated by the application of contact, friction, external voltage, etc., by combining a specific propylene compolymer and a polymeric charge-transfer type complex which is prepared by reacting an organic boron polymeric compound having boron atoms incorporated regularly within molecules while maintaining the semi-polar bound structure with a hydroxylamine.

Thus, the present invention comprises an antistatic resin composition comprising the components (1) and (2) shown below:

component (1): a propylene copolymer comprising (A) and/or (B) shown below:
(A) a propylene random copolymer having a melt flow rate of 0.1 to 70 g/10 min. obtained by feeding 0.5 to 4.0% by weight of ethylene, 66.0 to 98.5% by weight of propylene and 1.0 to 30.0% by weight of an α-olefin having 4 to 12 carbon atoms (all ratios based on the total amount of said three components) into a polymerization system;
(B) a propylene random copolymer having a melt flow rate of 0.1 to 70 g/10 min. obtained by feeding 2.5 to 10.0% by weight of ethylene and 90.0 to 97.5% by weight of propylene (both ratios based on the total amount of said two components) into a polymerization system;

component (2): a polymeric charge transfer type complex which is the reaction product of one or more of semi-polar organic boron polymeric compounds represented by the formula I shown below with one or more of tertiary amines with total carbon atoms of 5 to 82 having at least one hydroxyl group, produced through reaction at a ratio of one boron atom to one basic nitrogen atom:

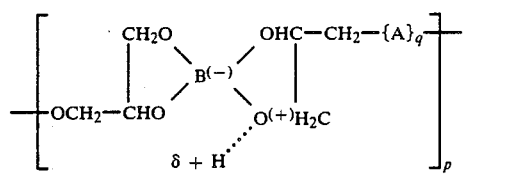

wherein q is 0 or 1, and when q=1, A represents —(X)a—(Y)b—(Z)c— group [X and Z each represent an oxygen-containing hydrocarbon residue with a total of 100 carbon atoms or less having one terminal ether residue, and Y represents

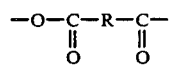

group (R is a hydrocarbon group having 1 to 82 carbon atoms) or

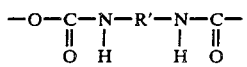

group (R' is a hydrocarbon group having 2 to 13 carbon atoms). a, b and c are each 0 or 1]; and p is 10 to 1000.

The antistatic resin composition according to the present invention has a persistent antistatic effect which can be called a permanent antistatic resin composition.

More specifically, the specific polymeric charge-transfer type complex of the present invention to be used with the specific propylene copolymer, despite the fact that it is a polymeric substance of large polarity due to its ionic structure of the coordinate bond type, is well miscible by fusion with the propylene copolymer which is of small polarity. Moreover, the charge-transfer type complex acts as a foreign matter while taking the form of the Fermi level. Therefore, unlike the above mentioned antistatic agents which neutralize only charges on the surface of a substrate material, the charge-transfer type complex according to the invention /not only can make a substrate resin into a permanent non chargeable material even to the inner portion under conventional conditions, but also can constantly effect 100% leakage of charges which are produced when forced charging is conducted repeatedly under high voltage. Also, the specific polymeric charge-transfer type complex of the present invention is an electroconductive polymer exhibiting mobility of electrons. Accordingly, since electronic conductivity is exhibited for the complex, as different from the antistatic agent whose antistatic function is based on the ion conduction mechanism, the antistatic effect can be sufficiently exhibited even if it is not present on the surface of a substrate material.

Furthermore, the specific polymeric charge-transfer type complex of the present invention has extremely good thermal stability. Therefore, the resin composition containing this complex suffers from no substantial lowering in the physical properties due to the thermal deterioration of the complex during handling at high molding temperature.

DETAILED DESCRIPTION OF THE INVENTION

The antistatic resin composition according to the present invention comprises the component (1) and the component (2).

The term "comprises" herein means that auxiliary materials (described in detail below) other than these two essential components may be contained without departure from the scope of the present invention.

Component (1)

The propylene copolymer to be used in the present invention is a propylene random copolymer represented by (A) and/or (B) shown below.

The propylene random copolymer (A) is a propylene random copolymer having a melt flow rate of 0.1 to 70 g/10 min., preferably 0.5 to 50 g/10 min. obtained by feeding 0.5 to 4.0% by weight of ethylene, 66.0 to 98.5% by weight of propylene and 1.0 to 30.0% by weight of an α-olefin having 4 to 12 carbon atoms into a polymerization system (based on the total amount of these three monomers). A preferable monomer composition comprises 1.0 to 3.0% by weight of ethylene, 77.0 to 97.0% by weight of propylene and 2.0 to 20.0% by weight of the α-olefin.

At proportions other than those specified above, for example, if the proportion of ethylene feed is made less than 0.5% by weight, or the feed proportion of an α-olefin having 4 to 12 carbon atoms is made less than 1.0% by weight, high-performance antistatic effect as intended by the present invention cannot be obtained. On the other hand, if the feed proportion of ethylene is made larger than 4.0% by weight, or the feed ratio of an α-olefin having 4 to 12 carbon atoms is made larger than 30.0% by weight, rigidity of the molded product or the opening characteristic in the case of film, etc. may be worsened to undesirably impair important characteristics inherent in polypropylene.

The α-olefin having 4 to 12 carbon atoms may include butene-1, pentene-1, hexene-1, heptene-1, octene-1, 1-methyl-butene-1, etc., and these can be also used as a mixture.

The propylene random copolymer (B) which is used in place of the above propylene random copolymer (A) or together therewith, is a propylene random copolymer having a melt flow rate of 0.1 to 70 g/10 min., preferably 0.5 to 50 g/10 min. obtained by feeding 2.5 to 10.0% by weight of ethylene and 90.0 to 97.5% by weight of propylene (based on the total amount of the two monomers). A preferable monomer composition comprises 3.5 to 6.0% by weight of ethylene and 94.0 to 96.5% by weight of propylene.

At proportions other than those specified above, for example, if the feed proportion of ethylene is made less than 2.5% by weight, high-performance antistatic effect as intended by the present invention cannot be obtained. On the other hand, if the feed proportion of ethylene is made larger than 10.0% by weight, rigidity of the molded product or opening characteristic in the case of film, etc. may be worsened to undesirably impair important characteristics inherent in polypropylene.

The propylene random copolymers (A) and (B) may be prepared according to any suitable preparation method.

The catalyst system required for copolymerization of the above monomers generally comprises components of a Ziegler-Natta system which, as is well known in the art, basically comprises a combination of a transition metal compound component and a reducing metal compound component, and including its various modifiers, is well known.

As the transition metal compound components, compounds of transition metals of the groups IV to VI of the periodic table are generally available, with titanium compounds being preferred. As the said compounds, there may be included halides, oxyhalides, alkoxy compounds and alkoxyhalides, etc. Specific compounds may include titanium tetrachloride, titanium tetrabromide, titanium tetraiodide, titanium trichloride, titanium tribromide, titanium triiodide, titanium dichloride and the like, with titanium trichloride in particular, being preferably used. These can be also used as mixtures.

The reducing metal compound components may be preferably hydrides and organometallic compounds of the metals of the groups I to III of the periodic table. Particularly suitable compounds are hydrides of aluminum and organic aluminum compounds of the formula:

$$AlR_nX_{a-n}$$

wherein R is a hydrocarbon residue, particularly an alkyl, cycloalkyl or aryl group of about 8 carbon atoms or less, with X being a halogen and n being 3, 2, 1.5 or 1. The halogen may be suitably chlorine at least for economic reasons. Specific examples of such aluminum compounds may include trialkylaluminum (alkyl is methyl to octyl, particularly a lower alkyl of about $C_4$ or less), dialkylaluminum chloride, alkylaluminum sesquichloride, alkylaluminum dichloride, etc. These can be also used as mixtures.

The quantitative ratio of these transition metal compound components to the reducing metal compound components may be any desired one which can be generally used for Ziegler type catalyst systems. More specifically, in the case of, for example, a combination of a titanium compound (i) and an organic aluminum compound (ii), the molar ratio of (ii)/(i) may be about 0.5 to 20, preferably 1 to 10.

It has been known in the art that Ziegler type catalyst systems comprising basically the above two components, can be modified by various modifiers. An example of such a modifier is an electron donating compound. As the electron donating compound, there may be included acid anhydrides, esters, ketones, amines, glycols and glycol ethers, with methylmethacrylate being a specific example. Another example of a modifier is a carrier for the transition metal compound component. A most representative carrier is a magnesium compound, particularly magnesium chloride. The above electron-donating compound can be also used in the preparation of the carried transition metal component.

Copolymerization may be generally carried out in the presence of an inert organic solvent, including hydrocarbons such as benzene, toluene, xylene, pentane, hexane, heptane, cyclohexane or the like, halogenated hydrocarbons such as chlorobenzene and methylene chloride or by use of the above mentioned monomers for polymerization such as u olefins as the solvent, or in a gas phase, at any desired temperature, for example, at a temperature of about 0° to 200° C. (preferably 30° to 100° C.), and under any desired pressure, for example, from atmospheric pressure to about 100 atm. (preferably from atmospheric pressure to 60 atm.), by the use or without the use of a molecular weight modifier such as hydrogen gas.

The obtained copolymers (A) and (B) have substantially the same proportions of monomer component constitutions as the proportions of the monomers employed.

Component (2)

The specific polymeric charge-transfer type complex to be used as the antistatic material in the present invention is the reaction product of one or more of semipolar organic boron polymeric compounds of the above formula (I) and one or more of hydroxyl containing tertiary amines (the reaction product being produced through reaction at a ratio of one boron atom to one basic nitrogen atom).

The boron compound of the formula (I) can be prepared according to, for example, method (a) or (b) as described below.

Method (a): A triesterification reaction is carried out by reacting one mole of boric acid or a boric acid triester of a lower alcohol having 4 or less carbon atoms or 0.5 mole of boric anhydride, with a compound represented by the formula II:

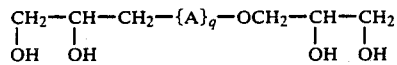

wherein q is 0 or 1, and when q=1, A represents —(X-)a—(Y)b—(Z)c— group [X and Z each represent an oxygen-containing hydrocarbon residue with a total of 100 carbon atoms or less having one terminal ether residue, and Y represents

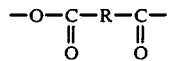

group (R is a hydrocarbon group having 1 to 82, preferably 6 to 82 carbon atoms) or

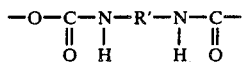

group (R' is a hydrocarbon group having 2 to 13, preferably 6 to 13 carbon atoms). a, b and c are each 0 or 1].

Method (b): A polyetherification reaction is carried out for di(glycerine)=borate or one or more of diols having a total of 206 carbon atoms or less, preferably 10 to 100, containing di(glycerine)=borate residue in the interior; or alternatively, one or more of them are reacted at a molar ratio of 1:1 with one or more of dicarboxylic acids having 3 to 84, preferably 8 to 84 carbon atoms (hereinafter called specific dicarboxylic acids), or with esters of lower alcohols having 4 or less carbon atoms with the specific dicarboxylic acids, or with halides of the specific dicarboxylic acids, or with diisocyanates having 4 to 15, preferably 8 to 15 carbon atoms (hereinafter called specific diisocyanates).

One or more of the semi-polar organic boron polymeric compounds thus prepared (hereinafter called specific semi-polar organic boron polymeric compounds) and one or more of tertiary amines with total carbon atoms of 5 to 82, preferably 5 to 30, having at least one hydroxyl group (hereinafter called specific tertially amines) are charged into a closed or open type reactor at a charging ratio of one boron atom to one basic nitrogen atom, and reaction is carried out under atmospheric pressure at 20° to 200° C., preferably 50° to 150° C., whereby the antistatic agent of the present invention (hereinafter called the specific polymeric charge transfer type complex) is prepared. During the reaction, if a polar solvent such as alcohol, ether, ketone, etc. is permitted to co-exist, the reaction can proceed more easily.

The starting materials for deriving the specific polymeric charge transfer type complex and the specific semi-polar organic boron polymeric compound as an intermediate are as described below.

First, examples of the compounds represented by the formula II, which are the starting materials in method (a) for deriving the specific semi-polar organic boron polymeric compound, may include diglycerine, di(glycerine)=malonate, di(glycerine)=maleate, di(glycerine)=adipate, di(glycerine)=terephthalate, di(glycerine)=dodecanate, poly(9 mole)oxyethylene=di(glycerol-ether), di(glycerine)=tolylenedicarbamate, di(glycerine)=methylenebis(4-phenylcarbamate), etc. Examples of the specific dicarboxylic acids used in method (b) may include malonic acid, maleic acid, succinic acid, adipic acid, sebacic acid, phthalic acid, terephthalic acid, dodecanic diacid, a dimer acid derived from linoleic acid, dodecylmaleic acid, dodecenylmaleic acid, octadecylmaleic acid, octadecenylmaleic acid, maleic acid having a polybutenyl group of an average polymerization degree of 20 coupled thereto, etc. Examples of the specific diisocyanates may include ethylene diisocyanate, hexamethylene diisocyanate, tolylene diisocyanate and methylene-bis(4-phenyl isocyanate) and the like.

Next, examples of the specific tertiary amines to be reacted with the specific semi-polar organic boron polymeric compound may include diethyl=hydroxymethylamine, dimethyl=2-hydroxypropylamine, methyl=di(2-hydroxyethyl)amine, tri(2-hydroxyethyl)amine, hydroxymethyl=di(2-hydroxyethyl)amine, dibenzyl=2-hydroxypropylamine, cyclohexyl=di(2-hydroxyethyl)amine, ethylene oxide (1 to 25 moles) adducts of di(hexadecyl)amine, and propylene oxide (1 to 26 moles) adducts of monobutylamine.

The use of amine starting materials other than tertiary amines for the reaction with the specific semipolar organic boron polymeric compound, namely primary or secondary amines, cannot successfully prepare the charge-transfer type complex, and also, the prepared complex is likely to be unstable and involves difficulties in the exhibition and maintenance of electrical conductivity, and therefore cannot give a permanent antistatic property to the propylene copolymer comprising the above (A) and/or (B).

Also, when a tertiary amine having no hydroxyl group is used, linking between the formed polymeric charge-transfer type complex molecules with multiple hydrogen bond is impossible, and therefore mobility of the individual chains is increased to cause changes to occur in the gathered state of the complex in the substrate material to produce the undesirable effect of insuffficient charge leakage.

Composition of the invention

The amount of the specific charge-transfer type complex of the present invention to be blended with the propylene copolymer may differ depending on the purpose, but may generally be 0.01 to 10 parts by weight, preferably 0.05 to 5 parts by weight, particularly preferably 0.1 to 3 parts by weight, based on 100 parts by weight of the propylene copolymer. If it is too small, the high-performance antistatic effect which is the object of the present invention cannot be obtained. On the other hand, if it is too large, undesirable problems such as coloration and bleeding will occur.

If desired, the resin composition of the present invention can be formulated with inorganic fillers, organic fillers, polymeric materials including polyolefin resins different from the propylene copolymer of the present invention, elastomers, etc. within the range which does not impair the effect of the present invention, to improve processability, rigidity, flexibility, etc. The above polymeric materials should be preferably used in amounts up to 50% by weight of the composition of the present invention.

As a matter of course, formulating agents other than the above components, for example, processing aids such as stabilizers, anti oxidants, lubricants, anti-blocking agents, etc., flame retardants, various pigments, dyes, UV absorbers, etc. can also be used, according to necessity.

The resin composition of the present invention may be prepared according to any compounding method known in the prior art.

For example, open rolls, intensive mixers, cokneaders, single-screw or twin-screw extruders may be employed as a kneading method.

As a specific example, the specific polymeric charge-transfer type complex and the optional additive components are added to the propylene copolymer of the present invention in the form of powder or pellets, mixed by a Henscel mixer or the like, and then melt-kneaded through a single-screw or twin-screw extruder to form a composition in the form of pellets. The additional components may be added in the course of kneading or, alternatively, added according to the master-batch method.

The obtained pellets are subjected to various molding processes such as injection molding, extrusion molding, hollow molding, air-pressure forming, film forming, hot pressing molding, spinning, etc., and, according to necessity, are further subjected to secondary processings to give a molded product.

In the case of extrusion molding, hollow molding, etc. into films and sheets, multi-layer formation with other resins is also possible, and, in that case, the resin composition of the present invention can be used to one surface layer or both surface layers depending on purposes.

Furthermore, the resin composition of the present invention can also be used in forming its layer on the surface of a molded product comprising a resin containing a metal, a metal oxide or a carbon type electrically-conductive filler.

These molded products can be utilized in many fields where an antistatic effect or the elimination of static charges is desired. For example, for antistatic purposes, they can be applied to packaging materials for conveying and storing IC (carrier, tray, bag, rack, container, etc.), parts box for electronic parts, cases for magnetic tapes and audio tapes, slip sheets, packing materials for dangerous materials such as explosives. For static charge elimination, they can be applied to destaticizing rolls and sheets, etc. Moreover, as semiconducting materials, they can be applied to information recording papers, various resistors, etc.

Molded products obtained by permitting electrically-conductive fillers such as powdery or fibrous silver, copper, brass, iron, etc., or carbon black, tin-coated titanium oxide, tin-coated silica, etc. to be co-present with the resin composition of the present invention become electromagnetic wave shielding materials with higher precision.

EXAMPLES

The present invention is described in more detail by referring to the following examples. In the examples, "parts" means parts by weight and "%" means % by weight.

The specific polymeric charge transfer type complexes used in the examples are those having the structural formulae shown below in Table 1.

EXAMPLE 1

To 100 parts of a propylene random copolymer powder with MFR of 6.0 comprising 1.8% of ethylene, 85.7% of propylene and 12.5% of butene was added the specific polymeric charge-transfer type complex of the present invention in an amount as shown in Table 2, and the mixture was melt-kneaded through a single screw extruder at 200° C. to obtain pellets. By the use of the pellets, sheet molding was conducted at 180° C. to obtain a sheet with a thickness of 150 μm. Then, the sheet was left standing under constant temperature and humidity conditions of 23° C. and 50% RH for 3 days, and 30 days, and the surface resistance and the charge attenuation rate (calculated based on the amount of charges produced by forced charging by application of a voltage of 10 KV on the sample surface and the amount of the residual charges 2 minutes after stopping of the voltage application) were measured on the sheet. As comparative tests, the above procedure was repeated except for using N,N-di(2-hydroxyethyl)stearylamine and glyceryl monostearate, which are known antistatic agents, in place of the specific polymeric charge-transfer type complex.

The test results are shown in Table 2, from which it can be seen that the propylene random copolymer sheets having the specific polymeric charge-transfer type complexes dispersed homogeneously therein have no charge remaining therein, and that the performance does not deteriorate with time.

EXAMPLE 2

To 100 parts of a propylene random copolymer powder with MFR of 4 comprising 5.5% of ethylene and 94.5% of propylene were added the specific polymeric charge-transfer type complex of the present invention, an antiblocking agent and a slipping agent in appropriate amounts, respectively, and the mixture was melt-kneaded through a single screw extruder at 200° C. to obtain pellets. By the use of the pellets, film molding was conducted using a T-die extruder at 200° C. to obtain a film with a thickness of 50 microns. The electrical characteristics of the film thus obtained were measured in the same manner as in Example 1.

As comparative tests, the above procedure was repeated except for using a homopolypropylene with MFR of 4 and a propylene random copolymer with MFR of 4 comprising 2.2% of ethylene and 97.8% of propylene in place of the above propylene random copolymer.

The test results are shown in Table 3. It is apparent from Table 3 that the films made of the compositions of the present invention have no charge remaining therein, while the films according to the comparative tests exhibit an insufficient effect of charge attenuation. Furthermore, it was found that the films made of the compositions according to the invention exhibit a better light transmission than a film which was prepared in the same way as Example 2 except for not using the specific polymeric charge transfer type complex.

EXAMPLE 3

Using the composition in Example 2 and a propylene homopolymer (MFR=1), die lamination molding was carried out by means of a multi-layer sheet molding machine at 200° C. to prepare a sheet with a triple layer constitution of the composition of the present invention/propylene homopolymer/the composition of the present invention (thicknesses of the respective layers: 100/500/100 microns). The electrical characteristics of the multilayer sheet were measured according to the same method as in Example 1. Measurement of the electrical characteristics was conducted also on a product obtained through vacuum forming of said sheet.

Vacuum forming was practiced at 180° C. The formed product had a rectangular shape of 120×70×25 (mm).

As comparative tests, the above procedure was repeated except for using N,N-di(2-hydroxyethyl)-stearylamine which is a known antistatic agent.

The test results are shown in Table 4. It is apparent from Table 4 that the multi layer sheet whose surface layers are formed of the propylene random copolymer having the specific polymeric charge transfer type complex homogeneously dispersed therein hardly suffers from lowering in the electrical characteristics with time. Furthermore, it is also apparent that the electrical characteristics of this multi-layer sheet do not deteriorate so much even when heat history and elongation are applied by vacuum forming.

EXAMPLE 4

To 100 parts of a propylene random copolymer powder with MFR of 15 comprising 1.2% of ethylene, 78.3% of propylene and 20.5% of butene, the specific polymeric charge transfer type complex of the present invention was added in a given amount, and the mixture was melt-kneaded through a single screw extruder at 180° C. to obtain pellets. Next, 77% of the pellets, 3% of a polypropylene modified with maleic anhydride (maleic anhydride content 3%) and 20% of glass fibers treated with γ-aminopropyltriethoxysilane were melt-kneaded through a single screw extruder at 220° C. to obtain pellets. By use of the pellets, a sheet of 2 mm t×100 mm×100 mm was produced through an injection molding machine under the conditions of a cylinder temperature of 220° C. and a mold temperature of 40° C. The electrical characteristics of the sheet were measured according to the same method as in Example 1.

The test results are shown in Table 5. It is clearly shown in the table that the sheet prepared by the use of the composition of the present invention has no charge remaining therein. Moreover, it was found that the physical properties imparted by the glass fiber reinforcement were sufficiently retained.

EXAMPLE 5

To 100 parts of a resin comprising 50% of a propylene random copolymer powder with MFR of 6.0 comprising 1.8% of ethylene, 85.7% of propylene and 12.5% of butene and 50% of a propylene random copolymer with MFR of 7.2 comprising 2.8% of ethylene and 97.2% of propylene was added the specific polymeric charge-transfer type complex of the present invention in a given amount, and the mixture was melt-kneaded through a single screw extruder at 200° C. to obtain pellets. Sheet molding was carried out using the pellets at 180° C. to obtain a sheet with a thickness of 150 μm. The electrical characteristics of the sheet were measured according to the same method as in Example 1.

The test results are shown in Table 6. It is apparent from Table 6 that the propylene random copolymer sheet having the specific polymeric charge-transfer type complex of the present invention dispersed homogeneously therein has no charge remaining therein, and the performance does not deteriorate with time.

TABLE 1
Specific polymeric charge-transfer type complex
(1) 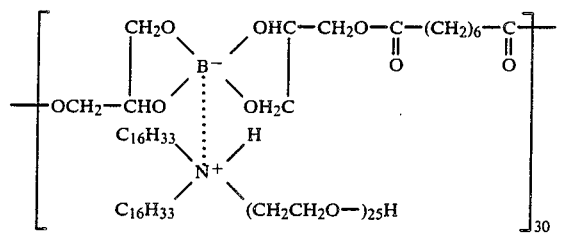
(2) 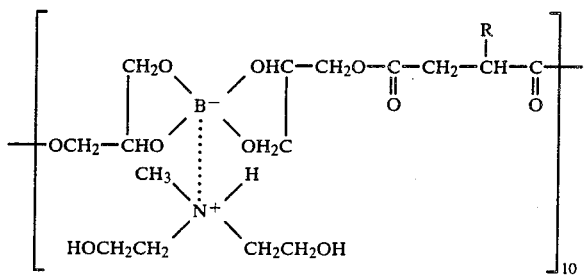
R is a residue of polybutene having an average degree of polymerization of 20
(3) 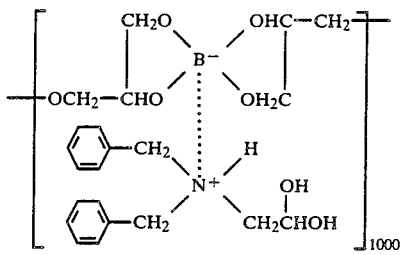
(4) 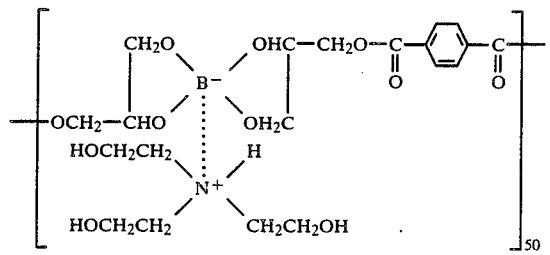
(5) 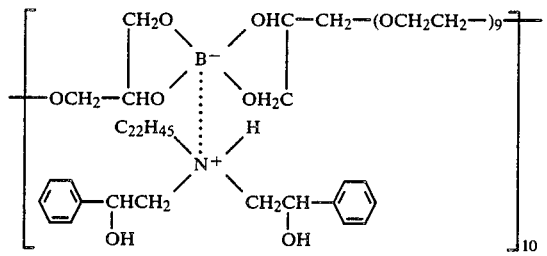
(6) 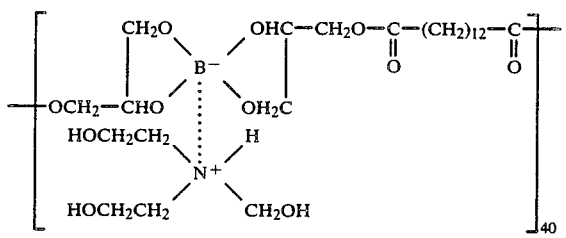

TABLE 1-continued
Specific polymeric charge-transfer type complex
(7) 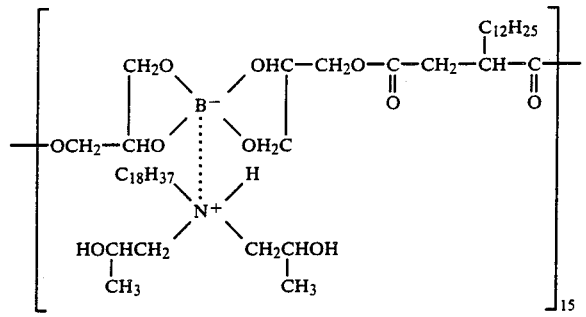
(8) 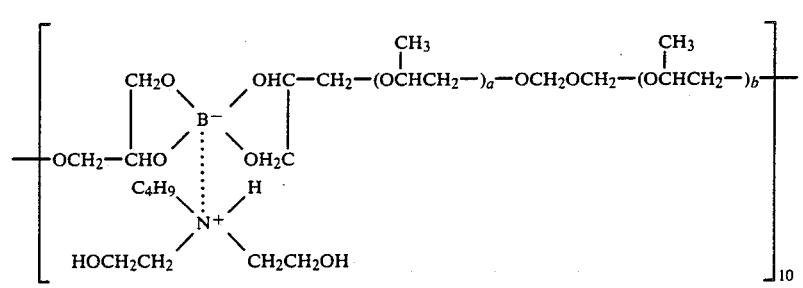
a + b = 66
(9) 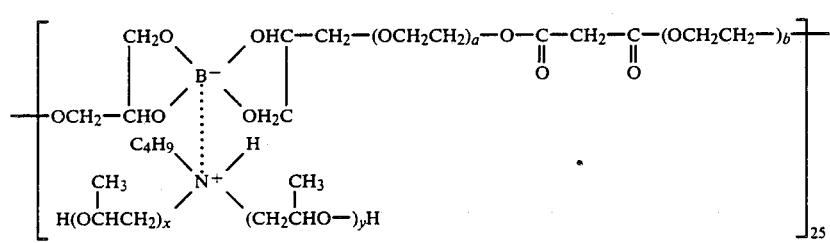
a + b = 20, x + y = 26
(10) 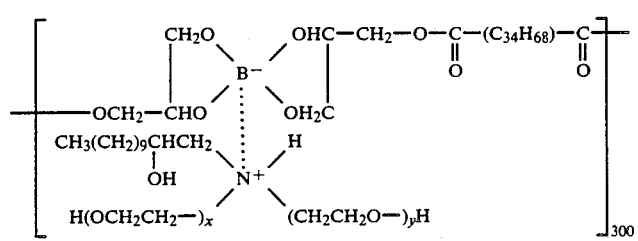
x + y = 10
(11) 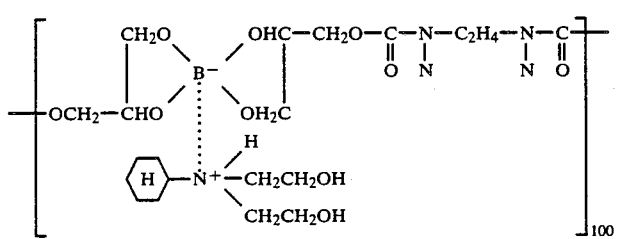

TABLE 1-continued

Specific polymeric charge-transfer type complex

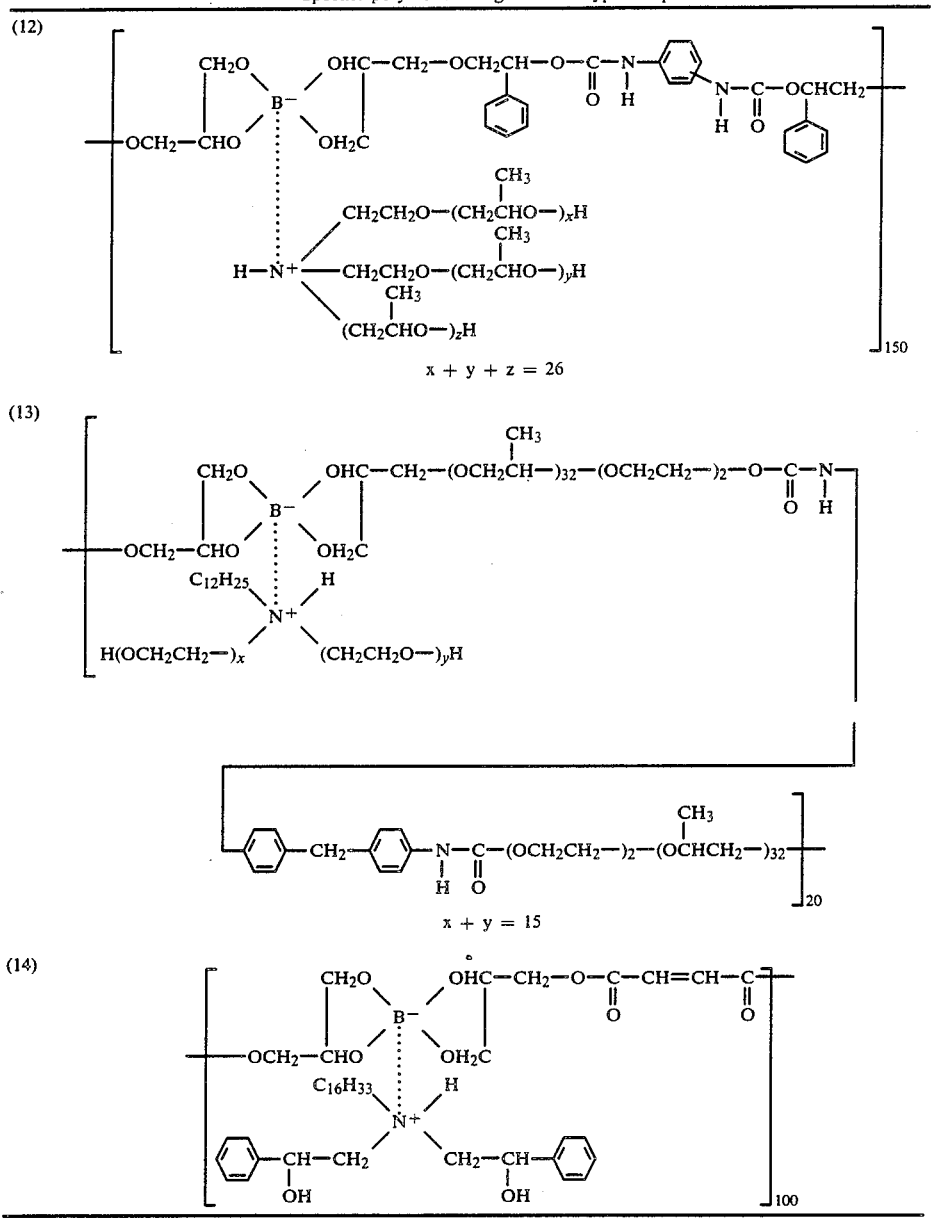

TABLE 2
(Example 1)

| Run No. | Specific polymeric charge-transfer type complex (Parts by weight based on 100 parts by weight of propylene copolymer) | | Day 3 | | Day 30 | |
|---|---|---|---|---|---|---|
| | | | Surface resistance ($\Omega$) | Charge attenuation rate (%) | Surface resistance ($\Omega$) | Charge attenuation rate (%) |
| 1 | Not added | | $2 \times 10^{16}$ | 4 | $2 \times 10^{16}$ | 4 |
| 2 | Specific polymeric charge-transfer type complex (1) | (1.0 part) | $3 \times 10^{11}$ | 100 | $3 \times 10^{11}$ | 100 |
| 3 | Specific polymeric charge-transfer type complex (1) | (0.7 part) | $3 \times 10^{11}$ | 100 | $3 \times 10^{11}$ | 100 |
| 4 | Specific polymeric charge-transfer type complex (1) | (0.5 part) | $6 \times 10^{11}$ | 100 | $6 \times 10^{11}$ | 100 |
| 5 | Specific polymeric charge-transfer type complex (1) | (0.3 part) | $9 \times 10^{11}$ | 100 | $9 \times 10^{11}$ | 100 |
| 6 | Specific polymeric charge-transfer type complex (2) | (1.5 parts) | $2 \times 10^{11}$ | 100 | $2 \times 10^{11}$ | 100 |
| Comp. | | | | | | |
| 7 | N,N-di(2-hydroxyethyl)stearylamine | (1.0 part) | $1 \times 10^{12}$ | 92 | $4 \times 10^{13}$ | 71 |
| 8 | Glyceryl monostearate | (1.0 part) | $7 \times 10^{12}$ | 81 | $9 \times 10^{13}$ | 60 |
| 9 | Specific polymeric charge-transfer type complex (3) 10% + Specific polymeric charge-transfer type complex (4) 90% | (1.0 part) | $6 \times 10^{11}$ | 100 | $6 \times 10^{11}$ | 100 |
| 10 | Specific polymeric charge-transfer type complex (5) | (1.5 parts) | $2 \times 10^{11}$ | 100 | $2 \times 10^{11}$ | 100 |

TABLE 2-continued (Example 1)

| Run No. | Specific polymeric charge-transfer type complex (Parts by weight based on 100 parts by weight of propylene copolymer) | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|
| 11 | Specific polymeric charge-transfer type complex (6) | (1.5 parts) | $1 \times 10^{11}$ | 100 | $1 \times 10^{11}$ | 100 |
| 12 | Specific polymeric charge-transfer type complex (7) | (1.5 parts) | $2 \times 10^{11}$ | 100 | $2 \times 10^{11}$ | 100 |
| 13 | Specific polymeric charge-transfer type complex (8) 80% + Specific polymeric charge-transfer type complex (9) 20% | (1.5 parts) | $5 \times 10^{11}$ | 100 | $5 \times 10^{11}$ | 100 |
| 14 | Specific polymeric charge-transfer type complex (10) | (1.0 part) | $9 \times 10^{10}$ | 100 | $9 \times 10^{10}$ | 100 |
| 15 | Specific polymeric charge-transfer type complex (11) 10% + Specific polymeric charge-transfer type complex (12) 90% | (1.0 part) | $7 \times 10^{11}$ | 100 | $7 \times 10^{11}$ | 100 |
| 16 | Specific polymeric charge-transfer type complex (13) 95% + Specific polymeric charge-transfer type complex (14) 5% | (1.0 part) | $1 \times 10^{11}$ | 100 | $1 \times 10^{11}$ | 100 |

TABLE 3

(Example 2)

| Run No. | Specific polymeric charge-transfer type complex (Parts by weight based on 100 parts by weight of propylene copolymer) | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|
| 17 | Specific polymeric charge-transfer type complex (1) | (1.5 parts) | $5 \times 10^{10}$ | 100 | $5 \times 10^{10}$ | 100 |
| 18 | Specific polymeric charge-transfer type complex (3) 10% + Specific polymeric charge-transfer type complex (4) 90% | (1.0 part) | $1 \times 10^{11}$ | 100 | $1 \times 10^{11}$ | 100 |
| 19 | Specific polymeric charge-transfer type complex (5) | (1.0 part) | $4 \times 10^{11}$ | 100 | $4 \times 10^{11}$ | 100 |
| 20 | Specific polymeric charge-transfer type complex (6) | (1.0 part) | $3 \times 10^{11}$ | 100 | $3 \times 10^{11}$ | 100 |
| 21 | Specific polymeric charge-transfer type complex (7) | (1.0 part) | $4 \times 10^{11}$ | 100 | $4 \times 10^{11}$ | 100 |
| 22 | Specific polymeric charge-transfer type complex (8) 80% + Specific polymeric charge-transfer type complex (9) 20% | (1.0 part) | $7 \times 10^{11}$ | 100 | $7 \times 10^{11}$ | 100 |
| 23 | Specific polymeric charge-transfer type complex (10) | (0.7 part) | $8 \times 10^{10}$ | 100 | $8 \times 10^{10}$ | 100 |
| 24 | Specific polymeric charge-transfer type complex (11) 10% + Specific polymeric charge-transfer type complex (12) 90% | (1.0 part) | $2 \times 10^{11}$ | 100 | $2 \times 10^{11}$ | 100 |
| 25 | Specific polymeric charge-transfer type complex (13) 95% + Specific polymeric charge-transfer type complex (14) 5% | (1.0 part) | $9 \times 10^{10}$ | 100 | $9 \times 10^{10}$ | 100 |
| Comp. 26 | [Homopolypropylene] Specific polymeric charge-transfer type complex (1) | (1.0 part) | $2 \times 10^{16}$ | 4 | $2 \times 10^{16}$ | 4 |
| 27 | [Propylene copolymer (ethylene 2.2%, propylene 97.8%)] Specific polymeric charge-transfer type complex (1) | (1.0 part) | $3 \times 10^{13}$ | 42 | $3 \times 10^{13}$ | 40 |

TABLE 4

(Example 3)

| Run No. | Specific polymeric charge-transfer type complex (Parts by weight based on 100 parts by weight of propylene copolymer) | | Day 3 Surface resistance ($\Omega$) | Day 3 Charge attenuation rate (%) | Day 30 Surface resistance ($\Omega$) | Day 30 Charge attenuation rate (%) |
|---|---|---|---|---|---|---|
| 28 | Specific polymeric charge-transfer type complex (1) | (1.0 part) | $6 \times 10^{10}$ $9 \times 10^{10}$* | 100 100* | $9 \times 10^{10}$ | 100 |
| Comp. 29 | N,N-di(2-hydroxyethyl)stearylamine | (1.0 part) | $1 \times 10^{12}$ $2 \times 10^{13}$* | 92 75* | $1 \times 10^{14}$ | 32 |

*Value for a product obtained through vacuum forming.

TABLE 5

(Example 4)

| Run No. | Specific polymeric charge-transfer type complex (Parts by weight based on 100 parts by weight of propylene copolymer) | | Day 3 | | Day 30 | |
|---|---|---|---|---|---|---|
| | | | Surface resistance ($\Omega$) | Charge attenuation rate (%) | Surface resistance ($\Omega$) | Charge attenuation rate (%) |
| 30 | Specific polymeric charge-transfer type complex (10) | (1.0 part) | $1 \times 10^{11}$ | 100 | $1 \times 10^{11}$ | 100 |

TABLE 6

(Example 5)

| Run No. | Specific polymeric charge-transfer type complex (Parts by weight based on 100 parts by weight of propylene copolymer) | | Day 3 | | Day 30 | |
|---|---|---|---|---|---|---|
| | | | Surface resistance ($\Omega$) | Charge attenuation rate (%) | Surface resistance ($\Omega$) | Charge attenuation rate (%) |
| 31 | Specific polymeric charge-transfer type complex (1) | (1.0 part) | $8 \times 10^{10}$ | 100 | $8 \times 10^{10}$ | 100 |
| 32 | Specific polymeric charge-transfer type complex (13) 90% + Specific polymeric charge-transfer type complex (14) 10% | (1.0 part) | $1 \times 10^{11}$ | 100 | $1 \times 10^{11}$ | 100 |

What is claimed is:

1. An antistatic resin composition comprising the components (1) and (2) shown below:

component (1): a propylene copolymer comprising (A) and/or (B) shown below:

(A) a propylene random copolymer having a melt flow rate of 0.1 to 70 g/10 min. obtained by feeding 0.5 to 4.0% by weight of ethylene, 66.0 to 98.5% by weight of propylene and 1.0 to 30.0% by weight of an α-olefin having 4 to 12 carbon atoms, all ratios based on the total amount of said three components, into a polymerization system;

(B) a propylene random copolymer having a melt flow rate of 0.1 to 70 g/10 min. obtained by feeding 2.5 to 10.0% by weight of ethylene and 90.0 to 97.5% by weight of propylene, both ratios based on the total amount of said two components, into a polymerization system;

component (2): a polymeric charge-transfer type complex which is the reaction product of one or more of semi-polar organic boron polymeric compounds represented by the formula I shown below with one or more of tertiary amines with total carbon atoms of 5 to 82 having at least one hydroxyl group, produced through reaction at a ratio of one boron atoms to one basic nitrogen atom:

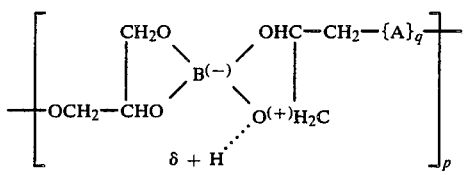

wherein q is 0 or 1, and when q=1, A represents —(X)a—(Y)b—(Z)c— group, X and Z each represent an oxygen-containing hydrocarbon residue with a total of 100 carbon atoms or less having one terminal ether residue, and Y represents

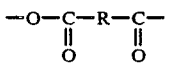

group, R is a hydrocarbon group having 1 to 82 carbon atoms, or

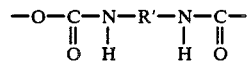

group R' is a hydrocarbon group having 2 to 13 carbon atoms, a, b and c are each 0 or 1; and p is 10 to 1000.

2. The antistatic resin composition according to claim 1, wherein the propylene random copolymer (A) is obtained by feeding 1.0 to 3.0% by weight of ethylene, 77.0% to 97.0% by weight of propylene and 2.0 to 20.0% by weight of an α-olefin having 4 to 12 atoms into a polymerization system.

3. The antistatic resin composition according to claim 1, wherein the propylene random copolymer (B) is obtained by feeding 3.5 to 6.0% by weight of ethylene and 94.0 to 96.5% by weight of propylene into a polymerization system.

4. The antistatic resin composition according to claim 1, wherein the tertiary amines are selected from the group consisting of diethyl=hydroxymethylamine, dimethyl=2-hydroxypropylamine, methyl=di(2-hydroxyethyl)amine, tri(2-hydroxyethyl)amine, hydroxymethyl=di(2-hydroxyethyl)amine, dibenzyl=2-hydroxypropylamine, cyclohexyl=di(2-hydroxyethyl)amine, 1 to 25 moles of ethylene oxide, adducts of di(hexadecyl)amine, and 1 to 26 moles of propylene oxide adducts to monobutylamine.

5. The antistatic resin composition according to claim 1, wherein the amount of component (2) is 0.01 to 10 parts by weight based on 100 parts by weight of component (1).

6. The antistatic resin composition according to claim 5, wherein the amount of component (2) is 0.1 to 3 parts by weight.

7. The antistatic resin composition according to claim 1 further comprising an inorganic or organic filler.

8. The antistatic resin composition according to claim 1 further comprising a polyolefin resin other than the propylene random copolymer (A) or (B) of component (1) in an amount up to 50% by weight of the composition.

* * * * *